Sept. 22, 1931. C. A. MESSMER, JR Re. 18,201

SHOE ORNAMENTING MACHINE

Original Filed April 16, 1926

INVENTOR.
Charles A. Messmer Jr.
BY
Allen & Allen
ATTORNEY.

Reissued Sept. 22, 1931

Re. 18,201

UNITED STATES PATENT OFFICE

CHARLES A. MESSMER, JR., OF ST. LOUIS, MISSOURI, ASSIGNOR TO BENJAMIN W. FREEMAN, OF CINCINNATI, OHIO

SHOE ORNAMENTING MACHINE

Original No. 1,696,442, dated December 25, 1928, Serial No. 102,444, filed April 16, 1926. Application for reissue filed February 17, 1930. Serial No. 429,161.

This invention relates generally to shoe ornamenting machines, and has more particular reference to a die that is especially useful when employed in a clicking press to cut out blanks for the various parts of the uppers of boots and shoes and the like.

Such presses are customarily provided with anvils presenting a wooden surface for engagement with the cutting edges of the die, in order to provide a surface which is softer than the cutting edges so as not to nick or dull the latter, and which permits the die to sink deeply enough thereinto to insure positive slitting of the material by the cutting edges. After each operation the die is shifted to a different position on the wooden surface so that the latter presents a fresh surface to the cutting edges during the succeeding operation. The prevailing practice heretofore has been to place the leather or other stock material in a different position on the wooden surface for each operation, and then to set the die in an appropriate position thereon, after which the actuation of the press is initiated and its head brought down upon the die, forcing the latter through the material. The proper placing of the die with relation to the stock prior to each operation is, however, attended with difficulties, since there is no means provided to determine the exact location of the die relatively to the stock, and the proper positioning of the die and the output of the press therefore depends largely upon the skill of the operator.

Accordingly, the primary purpose of this invention is to provide means whereby the die may be readily shifted after each operation to a new position over the wooden surface, and whereby the proper and expeditious placing of the stock with relation to the die will be facilitated. Other objects and advantages will appear in the course of the following description of a preferred embodiment of this invention.

In the accompanying drawings forming part of this specification, in which like numbers of reference denote like parts wherever they occur, Figure 1 is a perspective view of the die and associated parts comprising this invention;

Figure 1:
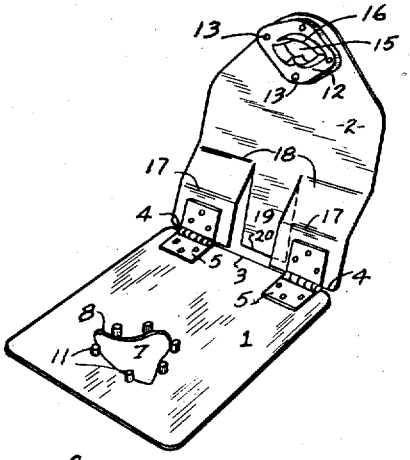
Figure 2:
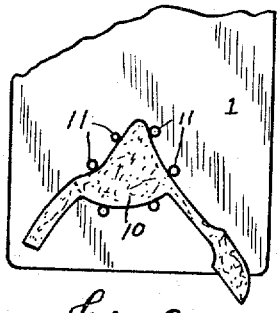
Figure 2 is a fragmentary plan view of the plate for determining the location of the stock with reference to the cutting edges of the die, showing the manner of placing the stock thereon prior to the cutting operation.
Figure 3:
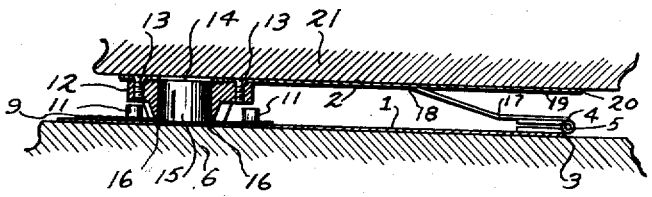
Figure 3 is a longitudinal vertical central sectional view through the device as it appears in the press during the cutting operation.

The device comprises a pair of plates 1 and 2, preferably formed of sheet steel and pivoted together at their rear edges 3 and 4, respectively, by means of suitable hinges 5. The plate 1 is placed upon the wooden block or anvil 6 of the press and constitutes a means or a member for holding the blank or stock of material in a definite position with relation to the cutting edges of the die during the cutting operation. The plate 1 is provided with an opening 7 therethrough whose edges 8 conform to the outline 9 of the blank or sheet of leather 10 to be placed therein, as shown in Figure 2. Gauge pins 11 are affixed to the plate 1 and project from the upper side thereof along the edges 8. The said pins 11 assist the edges 8 in locating the blank 10. The plate 2 constitutes a member or means for holding a die 12, secured thereto by means of screws 13, thus forming a mounting for the die. The plate 2 preferably has an opening 14 therethrough which registers with the opening 15 extending through the die 12 and defined by the cutting edges 16 thereof. When plate 2 is swung inwardly or closed upon plate 1, the cutting edges 16 of die 12 are brought against the blank 10 and in proper relation to the outline of the blank, as determined by the locating edges 8 and pins 11 of the plate 1. That portion of plate 2 to which the die is secured is preferably arranged parallel and in proper spaced relation to the plate 1 by reason of the offset bends 17 and 18 in the plate 2. The intermediate portion of the rear end of plate 2 is preferably struck out or separated from the outer portions thereof, and does not embody the bends 17 and 18, so that it forms a tongue 19 whose rear end 20 projects outwardly and is adapted to engage the wooden block or base 6 to limit the outward swing of the plate or die-holding member 2, preferably to a position slightly beyond the vertical, as shown in Figure 1.

Figure 4:
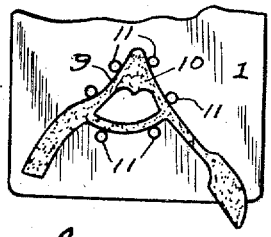
Figure 4 is a view similar to that of Figure 2, but showing the stock as it appears after having been blanked out by the die.

The manner of using the device will be readily comprehended. The device is placed on the wooden block or anvil 6 on the lower or stationary jaw of the clicking press, with the plate 1 resting thereon and the plate 2 swung open slightly beyond its vertical position, as shown in Figure 1. The blank 10 is placed in the opening 7 with its edges 9 abutting against the edges 8 of the opening. The plate 2 is then swung inwardly, bringing the cutting edges 16 of the die against the blank 10. The press is then started, causing the head 21 on the upper jaw of the press to descend on the plate 2, thereby sinking the cutting edges 16 through the blank 10 and into the block 6. After the ascension of head 21, the device is opened and the died-out blank 10, shown in Figure 4, is removed. The device is now shifted to a different position on the wooden block and the foregoing operation may be repeated. It will be observed that the die does not obscure the blank as it is being placed in position on the block 6, and the die will always be located in proper relation to the blank at the time of cutting the same.

On account of the bend 18, which may be made either high or low, the entire fitted-upper of a shoe may be laid between the plates 1 and 2.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. A shoe ornamenting machine having a plate having an opening adapted to receive and locate a sheet of stock to be blanked, gauge pins projecting from the said plate along the outline of said opening to assist the said opening in locating the said stock, and a die-holding member connected to the said plate so as to be movable toward and away from the said opening.

2. A shoe ornamenting machine having a normally horizontal stock-holding member, a die-holding member pivoted thereto by spaced hinges so that it may be swung over the stock-holding member in co-operating relation thereto or swung outwardly away from the stock-holding member, and a tongue struck out from the die-holding member intermediate said hinges for limiting the outward swing of said die-holding member.

3. A shoe ornamenting machine having a plate having an opening adapted to receive and locate a sheet of stock to be blanked, means associated with said plate and positioned adjacent said opening for assisting in the location of said stock, a die-holding member connected to said plate so as to be movable toward and away from said opening, and offset means for maintaining said plate and said die-holding member in proper spaced relation.

4. A shoe ornamenting machine having a plate having an opening adapted to receive and locate a sheet of stock to be blanked, gauge pins projecting from said plate along the outline of said opening to assist the said opening in locating said stock, a die-holding member hingedly connected to said plate so as to be movable toward and away from the said opening and a rearwardly directed tongue associated with said die-holding member for limiting the upward swing thereof.

5. A shoe ornamenting machine, adapted to operate upon fitted boot and shoe uppers, having a support for work, a presser head, an ornamenting die having a mounting, said die and mounting being located between said work support and presser head, and a positioning member provided with a projecting abutment engageable with a predetermined portion of the work to locate same in position to be ornamented, said member being connected with and movable relative to said die, said die being movable relative to the work support into juxtaposition with the work on said support, independently of the head, and adapted upon depression of said head to be urged downwardly into ornamenting relation with the work.

6. A shoe ornamenting machine adapted to operate upon fitted boot and shoe uppers having a support for the work, a presser head, an ornamenting die having a mounting, said die and mounting being located between said work support and said presser head, and a positioning member provided with means conforming to a predetermined characteristic of the work for locating a portion of the work to be ornamented, said member being connected with and movable relative to said die, said die being movable relative to the work support into juxtaposition with the work on said support, independently of the head, and adapted upon depression of said head to be urged downwardly into ornamenting relation with the work, said die mounting and die having connecting passages extending therethrough to permit the passage of chips.

7. A shoe ornamenting machine adapted to operate upon fitted boot and shoe uppers having a support for the work, a presser head, an ornamenting die having a mounting, said die and mounting being located between said work support and said presser head, and a positioning member provided with means conforming to a predetermined characteristic of the work for locating a portion of the work to be ornamented, said member being connected with and movable relative to said die, said die being movable relative to the work support into juxtaposition with the work on said support, independently of the head, and adapted upon depression of said head to be urged downwardly into ornamenting relation with the work, said die mounting and die having connecting passages extending therethrough to permit the passage of chips, the several elements of said machine being shaped and spaced to provide clearance spaces adjacent the work support for receiving portions of a fitted upper not to be ornamented during the ornamentation of the located other parts of said upper.

8. A shoe ornamenting machine adapted to operate upon fitted boot and shoe uppers having a support for the work, a presser head, an ornamenting die having a mounting, said die and mounting being located between said work support and said presser head, and a positioning member provided with a projecting abutment engageable with a predetermined portion of the work to locate same in position to be ornamented, said member being connected with and movable relative to said die, said die being movable relative to the work support into juxtaposition with the work on said support, independently of the head, and adapted upon depression of said head to be urged downwardly into ornamenting relation with the work, said die mounting and die having connecting passages extending therethrough to permit the passage of chips.

9. A shoe ornamenting machine adapted to operate upon fitted boot and shoe uppers having a support for the work, a presser head, an ornamenting die having a mounting, said die and mounting being located between said work support and said presser head, and a positioning member provided with a projecting abutment engageable with a predetermined portion of the work to locate same in position to be ornamented, said member being connected with and movable relative to said die, said die being movable relative to the work support into juxtaposition with the work on said support, independently of the head, and adapted upon depression of said head to be urged downwardly into ornamenting relation with the work, said die mounting and die having connecting passages extending therethrough to permit the passage of chips, the several elements of said machine being shaped and spaced to provide clearance spaces adjacent the work support for receiving portions of a fitted upper not to be ornamented, during the ornamentation of the located other parts of said upper.

10. A cutout press adapted to operate upon fitted boot and shoe uppers, having a work support, a cutting die provided with a mounting member, said die and member having a passage extending therethrough to permit the passage of chips; a presser member movable relative to said support, said support having a surface which is softer than the cutting edges of the die, a work positioning member associated with and movable relative to said cutting die, said member being provided with a projecting abutment engageable with a predetermined portion of the work and effective to locate the work in position to be ornamented, said die being movable into juxtaposition with the work disposed on said support, said presser member being effective when moving relative to the work support to cause said die to pierce the work, said positioning member and die mounting member being supported independently of said presser member and the several elements of said machine being shaped and spaced to provide clearance spaces adjacent the work support for receiving portions of the fitted upper not to be ornamented during the ornamentation of the pre-positioned other parts of said upper.

11. A shoe ornamenting machine adapted to operate upon fitted boot and shoe uppers comprising a work support, a presser member. a removable die support between said work support and presser member, including a die holding portion; a gauge plate connected to said die support; said plate resting on the work support with the top surface of the plate beneath the work, when said die support is operatively positioned in said machine, said plate having a work positioning abutment extending therefrom and engaging with the work to properly locate the work relative to said die.

12. A shoe ornamenting machine adapted to operate upon fitted boot and shoe uppers comprising a work support, a presser member, a removable die support between said work support and presser member, including a die holding portion; a gauge plate connected to said die support, said plate resting on the work support with the top surface of the plate beneath the work, when said die support is operatively positioned in said machine, said plate having a work positioning abutment extending therefrom and engageable with the work to properly locate the work relative to said die, the several elements of said machine being shaped and spaced to provide clearance spaces adjacent the work support for receiving portions of a fitted upper not to be ornamented, during the ornamentation of the located other parts of the upper.

CHARLES A. MESSMER, Jr.